No. 776,254. PATENTED NOV. 29, 1904.
O. OHLSON.
COMBINED SAW SET AND GAGE.
APPLICATION FILED FEB. 9, 1904.
NO MODEL.

WITNESSES:
J. W. Th. Olan
Wm. Sullivan Jr.

INVENTOR.
Olof Ohlson.
BY Pierre Barnes
ATTORNEY.

No. 776,254. Patented November 29, 1904.

UNITED STATES PATENT OFFICE.

OLOF OHLSON, OF ASTORIA, OREGON.

COMBINED SAW SET AND GAGE.

SPECIFICATION forming part of Letters Patent No. 776,254, dated November 29, 1904.

Application filed February 9, 1904. Serial No. 192,760. (No model.)

*To all whom it may concern:*

Be it known that I, OLOF OHLSON, a citizen of the United States, residing at Astoria, in the county of Clatsop and State of Oregon, have invented certain new and useful Improvements in a Combined Saw Set and Gage, of which the following is a specification, reference being had therein to the accompanying drawings.

This invention relates particularly to setting and gaging devices for saw-teeth; and the object of the invention is to provide an improved implement or tool for this class of work which will be simple in construction and efficient in operation and one which may be used by any one familiar with such operations to set the teeth of a saw with precision and dispatch. This object is attained in the construction and adaptation of devices hereinafter fully described, and which is illustrated in the accompanying drawings, wherein—

Figure 2:
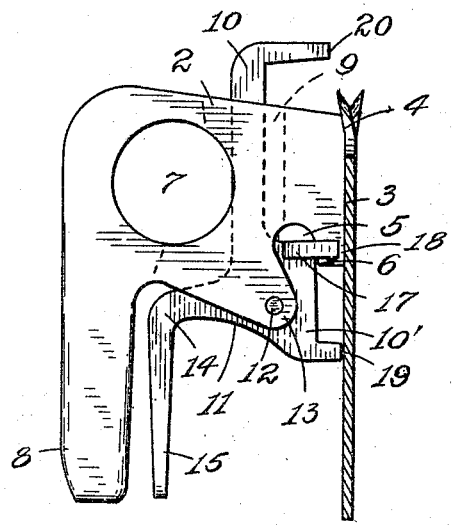
Figure 3:
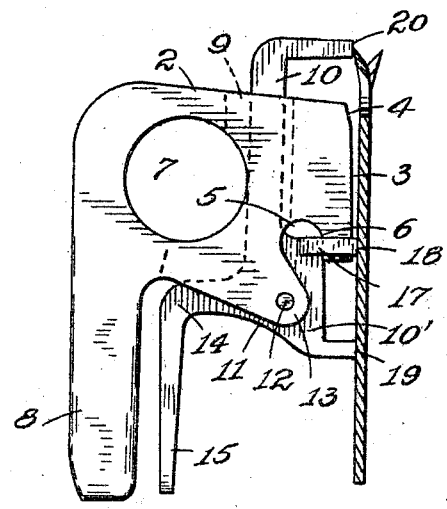
Figure 1:
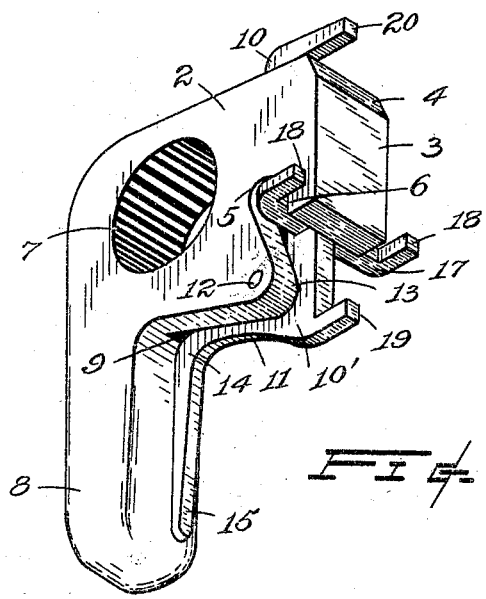

Figure 1 is a perspective view of a tool embodying my invention. Fig. 2 is a side elevation of the tool, showing the manner in which it is used with a saw for setting the teeth. Fig. 3 is a view similar to Fig. 2, showing the manner of using the tooth-gage.

The body or stock 2 of the tool consists of a set-block having at its front end a flat face 3, which is beveled adjacent its upper edge, as at 4, to form a die, upon which are bent the saw-teeth in setting, and to the rear of the lower end of the face 3 is a notch 5, having a transversely-arranged flat wall 6 at its forward side.

7 is a thumb-engaging aperture provided in the stock, and a handle 8 extends downwardly from the rear end of the same. Passing through a chamber 9 of the stock and in a vertical direction is the arm 10 of a lever 11, which is fulcrumed by pin 12 to pendent lugs 13 of the stock, while the other arm extends rearwardly to a bend 14 and thence down in a finger-gripping piece 15. The first-mentioned lever-arm 10 is continued, as at 10′, below the fulcrum-point and intermediate the length of this arm, and located so as to be within the notch 5 is a cross-bar 17. The ends of the arm 10 10′ and also of cross-bar 17 are each given a rectangular bend and severally terminate in the saw-contacting points 18, 19, and 20, of which all but the last-named one are in the same plane, while point 20 terminates at a predetermined distance to the rear thereof equal to the amount of set or bend to be given the saw-teeth.

The operation of the invention is as follows: The saw operated upon being first firmly secured with its teeth on top and in a horizontal position within a suitable saw clamp or vise the implement, which is held in the left hand, is placed against the blade of the saw upon the side opposite to the bevel of the particular tooth to be first set, the flat face 3 of the block pressed firmly against the blade, and the point of the tooth projecting somewhat above the upper edge of the block, all as plainly shown in Fig. 2. One or more blows with a hammer delivered upon the beveled side of the tooth being acted upon and in proximity of its point will bend the tooth against the beveled portion 4 of the implement, and thus form the set of that tooth. The gage has meanwhile been retained by an outward pressure of the ends of operator's middle fingers against the finger-piece 15, so that the contact-points, or at least the three uppermost ones, do not bear against the blade; but immediately a tooth is bent, as above described, the implement is moved downwardly, and the contact-points of the gage are tilted forward by a reverse pressure, with the said fingers of the hand grasping the finger-piece 15 until the said points project outside of the plane of the block-face 3 and the point 20 of the gage bears against the extreme point of the tooth, and if the other gage contact-points all touch the saw-blade, as in Fig. 3, then the tooth has been given the proper amount of an offset. Should, however, only the points 18 and 19 or 19 and 20 touch at the same time, then it is evident that the tooth has been set out insufficiently or too much, respectively. If the former condition prevails, the tooth is again treated as aforedescribed, or where too much bend has been given the tooth the excess thereof may be removed by placing the tool against the saw, so that the flat face 3 of which will include the entire tooth and a part of the blade and delivering at the bend a light blow with the hammer. After one tooth is properly set to gage the alternate teeth are successively acted upon and then the saw turned around in the vise to set the remaining teeth. By the present construction the implement is capable of being held rigidly in one hand, the back of the tool resting in the palm, the thumb being thrust through aperture 7, and the index-finger lying against the side of the stock, leaving the remaining fingers, as beforementioned, free to manipulate the gage device.

The advantages of the invention reside in the fact that stock may be conveniently held in the hand and the force of the blow imparted from the hammer is cushioned in the palm of the hand, the gage device is always ready for use and does not require the laying down of either the hammer or the set-block for another tool, as is necessary in the use of all implements of this class with which I am acquainted in order to gage the teeth, and consequently an increased amount of work may be accomplished than is possible under such conditions.

Having described my invention, what I claim as new, and desire to secure by Letters Patent, is—

In a saw set and gage, a body or stock provided with a flat front face beveled at its upper end to form a die, a handle carried by the body or stock, a lever pivoted in the body or stock, and having an arm extending through the stock and provided on its upper end with a contacting point, a cross-bar carried by the lever, the lever and cross-bar provided at the ends with contact-points that lie in a plane not including the contact-point carried by said arm, and a finger-gripping piece carried by the lever and projecting downwardly along the handle of the stock, as and for the purpose described.

In testimony whereof I affix my signature in presence of two witnesses.

OLOF OHLSON.

Witnesses:
 PIERRE BARNES,
 WM. C. KEITH.